March 26, 1946.   P. K. SAUNDERS   2,397,373
VALVE
Filed July 8, 1943

INVENTOR.
Philip K. Saunders
BY
Pennie Davis Marvin Edmonds
ATTORNEYS

Patented Mar. 26, 1946

2,397,373

UNITED STATES PATENT OFFICE 2,397,373

VALVE

Philip K. Saunders, Mamaroneck, N. Y., assignor to Saunders Valve Company of America, Inc., New York, N. Y., a corporation of Delaware Application July 8, 1943, Serial No. 493,875
In Great Britain July 9, 1942

5 Claims. (Cl. 251—24)

This invention relates to diaphragm valves constructed for streamline flow and provided with a flexible diaphragm of resilient material and a weir formed with a concave top surface serving as a seat for the diaphragm. More particularly, the invention is concerned with a novel valve of the type mentioned, which includes a diaphragm constructed to have a considerably greater effective thickness for purposes of compression than for flexure. The use of such diaphragm makes it possible to insure tight closing of the diaphragm against the seat, without doing injury to the diaphragm, despite inaccuracies in manufacture or assembly of the valve parts, and the new valve, accordingly, functions better and the diaphragm is of longer life than in prior similar valves.

Diaphragm valves, such as are disclosed in my prior Patents Nos. 1,855,991, 1,978,603, and Re. 19,151, for example, include a body having a bore or passage intersected by a shallow transverse weir, the upper face of which is concave and serves as a seat for a flexible, resilient diaphragm having its periphery clamped between a circumferential flange around an opening in the side of the body and a casing or bonnet enclosing the actuating mechanism. In such a valve, it is desirable that a minimum of frictional resistance should be offered to the flow of liquid when the valve is fully opened, and to obtain that result, the bore or passage should be streamlined and as little restricted as possible by the presence of the weir. Accordingly, to provide a valve having these features without undue bulk and expense, the diaphragm is constructed so that it makes equal movements from the plane in which it is attached to the fully open and fully closed positions. As the diaphragm must resist the pressure of the fluid in the valve, the diaphragm must be of substantial thickness and, therefore, it cannot be flexed beyond certain limits without strain and fatigue.

Experience has shown that the above desiderate can be achieved only if the diameter of the free portion of the diaphragm between its clamped edges is equal to about twice the bore of the valve at its inlet and outlet ports and if the diaphragm moves above and below its clamped edges by an amount equal to about one quarter of the bore. With valves so proportioned, the thickness of the diaphragm should increase in proportion to the square root of the bore in order that it may have maximum strength without undue fatigue in flexing and, in the case of diaphragms of reinforced rubber, the thickness of the diaphragm in inches should be about equal to the square root of three times the bore measured in inches. In actual practice, especially in large valves, the diaphragm is ordinarily flexed through the maximum possible amount consistent with its thickness. It will be readily apparent, however, that if it were not for considerations of flexing, it would be desirable to increase the thickness of the diaphragm considerably, so that the diaphragm could be forced tightly against its seat by the application of reasonable torque to the operating means, despite inaccuracies occurring in the manufacture of the parts, such as cracks, roughness, etc., or inaccuracies in the assembly of the parts.

The present invention is, accordingly, directed to the provision of a novel diaphragm valve in which the effective thickness of the diaphragm for purposes of compression is substantially greater than for purposes of flexure, so that the diaphragm has the increased thickness which permits it to be forced tightly against its seat, despite the inaccuracies above mentioned, but is still of such flexibility as not to undergo increased fatigue in flexing by reason of the increased thickness. The desired results are obtained without interfering with the flow of liquid through the valve and without adding to the bulk of the valve or increasing the cost to any substantial extent.

In the new valve, the diaphragm is of a thickness greater than that desirable for maximum strength without undue fatigue in flexing, and the development of the fatigue that would ordinarily arise by reason of flexing a diaphragm of such thickness is avoided by weakening a layer of the diaphragm on the side remote from the seat. This weakened layer may be coextensive with the diaphragm, although in some cases, it may be preferable to have the layer terminate inward from the edge of the diaphragm, so that the layer does not lie between the clamping surfaces and only the free part of the diaphragm is thickened. The latter arrangement reduces the labor involved in tightening the clamping bolts to obtain a good joint and also avoids the unsightly bulging of the diaphragm material at the joint. In order to save material and still obtain the advantage of the increased thickness where it is most needed, the diaphragm may be of ordinary thickness except for a bar integral with the diaphragm and extending across the latter in line with the seat, and bar being on the side of the diaphragm remote from the seat and being weakened, so that that part of the diaphragm including the bar is not unduly fatigued by flexing.

The integral layer representing the increased thickness of the diaphragm may be weakened in various ways to avoid its interference with flexure of the diaphragm. Thus, the layer may have a plurality of concentric notches of triangular cross-section extending inward from the surface of the layer to such a depth that the thickness of the diaphragm beyond the bottom of the notches is that normally employed. The angle of the notches is then selected to allow flexure with no greater resistance than heretofore. If the layer is coextensive with the diaphragm or the free area thereof, the notches may be concentric or have the form of a spiral about the center of the diaphragm. If the layer takes the form of a bar, the weakening may take various forms, such as transverse notches, conical perforations, or the like.

For a better understanding of the invention, reference may be made to the accompanying drawing in which Fig. 1 is a cross-sectional vertical view lengthwise of the new valve;

Figure 1:
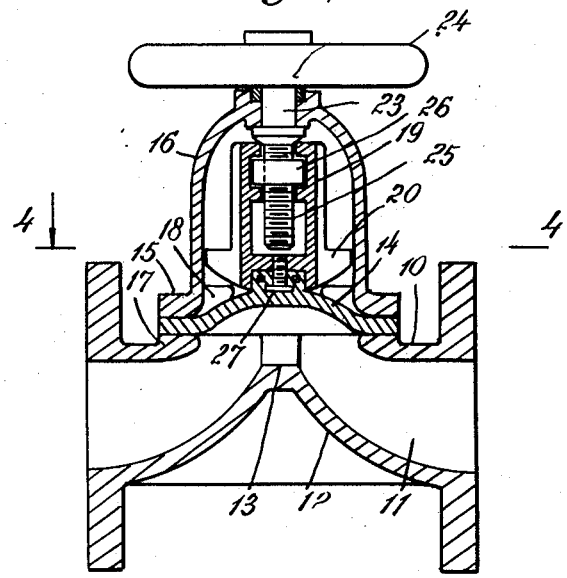
Figure 2:
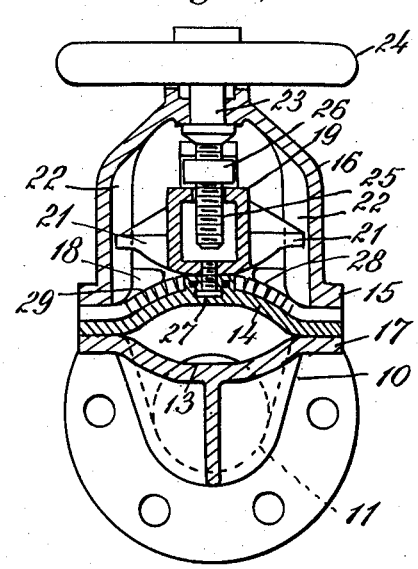
Fig. 2 is a transverse vertical cross-sectional view showing the valve in open position.
Figure 4:
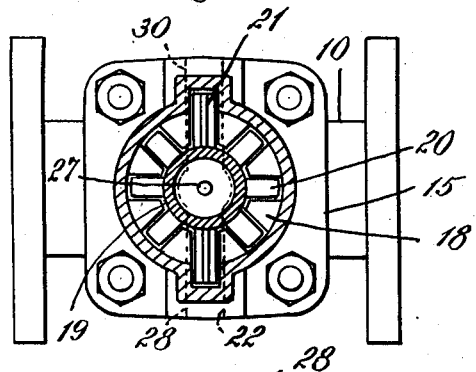
Fig. 4 is a sectional view on the line 4—4 of Fig. 1.
Figure 3:
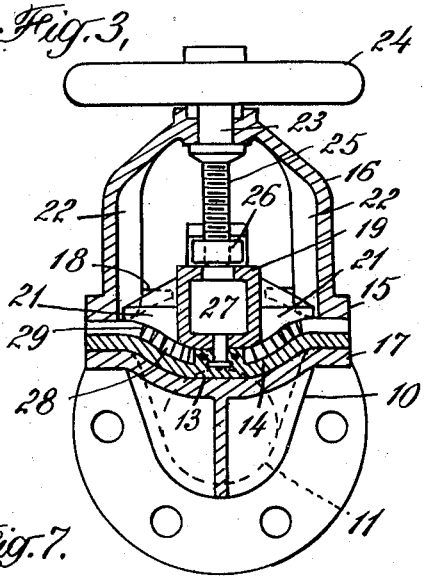
Fig. 3 is a view similar to Fig. 2 but showing the valve closed.

The valve shown in the drawing includes a body 10 having a substantially straight passage or bore 11 therethrough. The bore is intersected by a shallow weir 12 which extends across the width of the bore and part of its depth. The top surface 13 of the weir is concave and forms a seat for a flexible diaphragm 14 having its edges clamped between a circumferential flange 15 on a bonnet 16 and a similar flange 17 on the valve body surrounding an opening in the side of the body.

Extending inward from the inner face of the bonnet adjacent the open lower end thereof are toes 18 against which the diaphragm is seated for support when the valve is in fully opened position. The diaphragm is forced against the seat on the weir to close the valve by an actuator 19, which lies within the bonnet and is provided at its lower end with radial fingers 20, the lower surfaces of which are curved to conform to the shape of the diaphragm when flexed to closing position. A pair of the diametrical fingers 21 in line with the seat enter recesses 22 formed in the wall of the bonnet and serve to guide the actuator in its vertical movements.

A spindle 23 is mounted in an opening in the upper end of the bonnet and is provided at its exposed end with a hand wheel 24. The spindle is formed with a threaded lower end 25 on which is mounted a nut 26 which lies within a slot in the actuator. At its lower end, the actuator is connected to the diaphragm and, for this purpose, the diaphragm is provided with a stud 27 embedded in the diaphragm material and threaded into the lower end of the actuator. The construction of the actuating mechanism is such that by rotation of the hand wheel, the actuator may be moved up and down to open or close the valve.

As pointed out above, the diaphragm in a valve of this type has heretofore been limited in thickness so as to avoid undue fatigue in flexing, although the permissible thickness is less than is desirable to permit the diaphragm to be forced tightly against its seat by application of a reasonable torque on the actuating means, despite inaccuracies in the parts and misalignment thereof. In the valve illustrated, the diaphragm, in that portion overlying the seat, is made of a thickness greater than is normally employed, but undue stiffening of the diaphragm is avoided by weakening that part of the diaphragm which provides the additional thickness. In the construction shown in Figs. 1 to 5, the portion of diaphragm material providing the additional thickness takes the form of a bar or rib 28 of diaphragm material which extends across the face of the diaphragm remote from the seat from edge to edge and is provided with weakening means which take the form of transverse V-shaped notches 29. These notches extend from top to bottom of the bar so that the unweakened portion of the diaphragm is of ordinary thickness.

Figure 5:
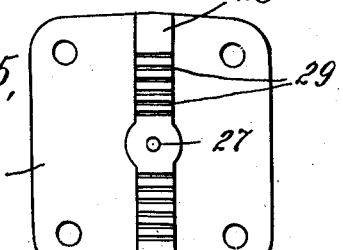
Fig. 5 is a plan view of one form of the new diaphragm.
Figure 6:
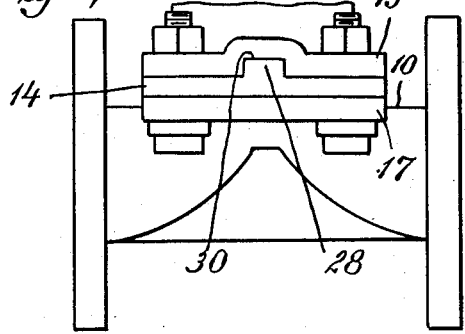
Fig. 6 is a fragmentary elevational view showing the manner in which the diaphragm of Fig. 5 is clamped in place.

In the construction shown in Fig. 5, the bar extends entirely across the diaphragm and such a diaphragm is mounted with the bar in alignment with the seat. The bar then lies beneath and is engaged by the fingers 21, which are of decreased depth necessary to accommodate the additional thickness provided by the bar. As the bar extends out between the clamping members, the flange 15 on the bonnet is formed with recesses 30 in which the ends of the bar may be received. These recesses are of such depth and form that the bar and the remainder of the periphery of the diaphragm are compressed when the clamping bolts are to be drawn tight. It is to be understood, however, that the bar may extend only across the free area of the diaphragm, in which event, no changes in the flanges 15 are required. Preferably the bar portion is of a thickness equal to about one half of the thickness of the diaphragm at either side of the bar and of a width equal to about twice the thickness of the diaphragm at either side of the bar.

When notches are used as weakening means, their cross-sectional shape is such that, as the diaphragm flexes to open and close the valve, the walls of certain of the notches are brought into contact while those of the others are more widely separated than initially. The notches thus prevent the bar from interfering with flexure of the diaphragm. Any suitable weakening means other than notches may be used, as desired, as, for example, the weakening means may take the form of conical recesses of appropriate size and spacing.

Figure 7:
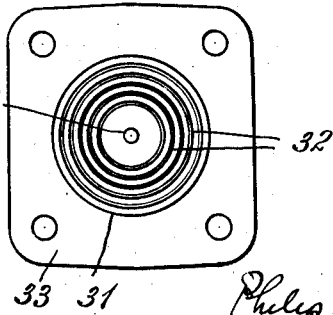
Fig. 7 is a view similar to Fig. 5 showing another form of diaphragm.

The diaphragm shown in Fig. 7 has a thickening portion 31 on one face and the thickened portion is weakened by concentric V-shaped notches 32, although these notches may have the form of a spiral, if preferred. The thickened portion is coextensive with only the free area of the diaphragm so that the periphery 33 thereof is unthickened. When the diaphragm is installed, the side on which the thickened portion is present lies remote from the seat.

The diaphragms employed in the several constructions mentioned may be of natural or synthetic rubber or rubber-like materials chosen with regard to the nature of the fluid passing through the valve. The diaphragm is preferably reinforced in the ordinary way.

The additional material in the form of a bar or otherwise, which gives the increased thickness to the diaphragm is integral with the remainder of the diaphragm and, since it is present on the face of the diaphragm remote from the seat and, therefore, not in the path of the fluid, the presence of the thickening portion in no way impedes the flow or impairs the streamlining of the valve. At the same time, the thickened portion gives the diaphragm increased mass, at least in alignment with the seat, so that a tight closure of the diaphragm against the seat can be made without difficulty and regardless of inaccuracies or misalignment of the valve parts.

I claim:

1. A diaphragm for use in a diaphragm valve, which comprises a sheet of flexible rubber-like material having a bar portion integral therewith projecting from one face of the sheet and extending transversely of the sheet, the bar portion having material removed therefrom to increase its flexibility.

2. A diaphragm for use in a diaphragm valve, which comprises a sheet of flexible rubber-like material having a bar portion integral therewith projecting from one face of the sheet and extending transversely of the sheet, the bar portion being formed with transverse notches extending inwardly from its outer face substantially to the plane of the face of the sheet from which the bar portion projects, the notches opening outwardly and having walls converging inwardly.

3. In a diaphragm valve including a body having a substantially straight passage therethrough intersected by a transverse weir extending upwardly part of the diameter of the passage and having a concave top surface forming a diaphragm seat, the body having an opening above the weir, the combination of a diaphragm closing the opening and having a transverse area in alignment with the seat, the diaphragm throughout said area being thicker than elsewhere and of a thickness greater than that providing maximum strength without undue fatigue in flexing, the increased thickness of the diaphragm being provided by a bar portion integral with the diaphragm and projecting from the face of the diaphragm remote from the seat, the bar portion being weakened by having material removed therefrom to increase its flexibility, and means, including a diaphragm backing member, for moving the diaphragm toward the seat, said backing member including fingers, two of which engage the top of the bar portion and the others of which engage the face of the diaphragm remote from the bar portion and having operating faces downwardly offset from the faces of the fingers engaging the top of the bar portion.

4. In a diaphragm valve including a body having a substantially straight passage therethrough intersected by a transverse weir extending upwardly part of the diameter of the passage and having a concave top surface forming a diaphragm seat, the body having an opening above the weir, a diaphragm closing the opening and having a transverse area in alignment with the seat, the diaphragm throughout said area having a thickness greater than elsewhere, said increased thickness throughout said area being provided by a bar portion integral with the diaphragm and projecting from the face of the diaphragm remote from the seat, the bar portion being formed with recesses extending inwardly from its outer surface to increase the flexibility of the bar portion.

5. In a diaphragm valve including a body having a substantially straight passage therethrough intersected by a transverse weir extending upwardly part of the diameter of the passage and having a concave top surface forming a diaphragm seat, the body having an opening above the weir, a diaphragm closing the opening and having a transverse area in alignment with the seat, the diaphragm throughout said area having a thickness greater than elsewhere, said increased thickness throughout said area being provided by a bar portion integral with the diaphragm and projecting from the face of the diaphragm remote from the seat, the bar portion being formed with transverse recesses extending inwardly from its outer surface and terminating substantially in the plane of the face of the sheet from which the bar portion projects.

PHILIP K. SAUNDERS.